(12) United States Patent
Nerkar

(10) Patent No.: US 12,174,767 B2
(45) Date of Patent: Dec. 24, 2024

(54) METHODS, DEVICES, SYSTEMS AND COMPUTER PROGRAM PRODUCTS FOR SENSOR SYSTEMS

(71) Applicant: Innosapien Agro Technologies Private Limited, Maharashtra (IN)

(72) Inventor: Sarang Dilip Nerkar, Maharashtra (IN)

(73) Assignee: Innosapien Agro Technologies Private Limited, Thane (IN)

( * ) Notice: Subject to any disclaimer, the term of this patent is extended or adjusted under 35 U.S.C. 154(b) by 10 days.

(21) Appl. No.: 17/796,059

(22) PCT Filed: Jan. 28, 2021

(86) PCT No.: PCT/IB2021/050661
§ 371 (c)(1),
(2) Date: Jul. 28, 2022

(87) PCT Pub. No.: WO2021/152493
PCT Pub. Date: Aug. 5, 2021

(65) Prior Publication Data
US 2023/0063205 A1    Mar. 2, 2023

(30) Foreign Application Priority Data

Jan. 28, 2020   (IN) .............................. 202021003826

(51) Int. Cl.
*G06F 13/362*    (2006.01)
(52) U.S. Cl.
CPC .................................. *G06F 13/362* (2013.01)
(58) Field of Classification Search
CPC ...................................................... G06F 13/362
See application file for complete search history.

(56) References Cited

U.S. PATENT DOCUMENTS

| | | | |
|---|---|---|---|
| 9,798,685 B1* | 10/2017 | Hanscom | G06F 13/4282 |
| 10,839,686 B2* | 11/2020 | Wunder | G06Q 50/10 |
| 2008/0319732 A1* | 12/2008 | Farnsworth | G06F 1/26 703/25 |
| 2016/0132450 A1* | 5/2016 | Aldebert | G06F 13/382 710/117 |
| 2016/0328348 A1* | 11/2016 | Iba | G06F 9/45558 |
| 2017/0161973 A1* | 6/2017 | Katta | G06Q 40/08 |
| 2017/0235692 A1 | 8/2017 | Ahamed et al. | |
| 2018/0249228 A1 | 8/2018 | Yoshikawa et al. | |
| 2019/0087359 A1 | 3/2019 | Litichever et al. | |

FOREIGN PATENT DOCUMENTS

DE   102014203021 A1   8/2015

OTHER PUBLICATIONS

International Search Report from PCT International Application No. PCT/IB2021/050661, dated May 28, 2021.

* cited by examiner

*Primary Examiner* — Henry Tsai
*Assistant Examiner* — John B Roche
(74) *Attorney, Agent, or Firm* — Budzyn IP Law, LLC

(57) ABSTRACT

The invention relates to sensor system arrangements and configurations. In particular, the invention provides methods, devices, systems and computer program products for implementing master-slave based or controller-sensor based configurations, which enable sensor devices to be readily added, substituted, swapped or hot-swapped into or out of a controller-sensor device arrangement. In an embodiment, the sensor system of the present invention includes an interface adaptor configured to enable the above.

23 Claims, 12 Drawing Sheets

METHODS, DEVICES, SYSTEMS AND COMPUTER PROGRAM PRODUCTS FOR SENSOR SYSTEMS

CROSS-REFERENCE TO RELATED APPLICATIONS

This Application is a National Stage Application under 35 U.S.C. § 371 of PCT Application No. PCT/IB/2021/050661, filed Jan. 28, 2021, which claims priority from and the benefit of Indian Patent Application No. 202021003826 filed on Jan. 28, 2020, which are hereby incorporated by reference in their respective entireties.

FIELD OF THE INVENTION

The invention relates to sensor system arrangements and configurations. In particular, the invention provides methods, devices, systems and computer program products for implementing master-slave based or controller-sensor based configurations which enable sensor devices to be readily added into, substituted within, swapped or hot-swapped into or out of a controller-sensor device arrangement.

BACKGROUND

Conventionally, sensors that are used to monitor or capture information relating to an environment-of-interest or region-of-interest are configured to communicate with a controller or with a processor, and to transmit (to such controller or processor) state data captured by such sensors and corresponding to a detected state of the environment-of-interest or region-of-interest.

The controller and sensor(s) may be communicably coupled in a master-slave arrangement, of a kind illustrated within sensor system 100 in FIG. 1. As shown in FIG. 1, sensor system 100 comprises a controller 102 and a sensor 104—wherein the controller 102 operates as a master device and the sensor 104 operates as a slave device. For the purposes of the present invention, the term "master" or "master device" may be understood as any device having data processing capabilities (for example, a microcontroller, processor, computing device or central computer) and that is configured to control one or more slave devices and/or receive, process, aggregate or transmit, data received from one or more slave devices. For the purposes of the present invention, the term "slave" or "slave device" may be understood as any peripheral device or sensor device having input functions, output functions or state sensing functions.

Ordinarily sensors that are communicably coupled with a corresponding controller (for example, in a master-slave configuration) use a data interface (for example any of the Inter-Integrated Circuit (I2C) serial bus interface, the I3C serial bus interface, and/or the serial peripheral interface (SPI)) as a bridge between the sensor and the controller to transmit data and/or control instructions to each other. State data captured by sensors can be transmitted to a corresponding controller through the data interface, and can be processed at or accessed through said controller.

FIG. 2 illustrates an exemplary sensor system 200 comprising a controller 202 and a sensor 204 operating in a master-slave configuration—wherein each is configured to communicate through an SPI data interface. As shown in FIG. 2, controller 202 comprises (i) power (Vdd) connector 2022 for establishing a power line with sensor 204, (ii) ground (Gnd) connector 2024 for establishing a ground connection with sensor 204, (iii) a clockline (SCL) connector 2026 for establishing a clockline with sensor 204 and generating and transmitting a clock signal to sensor 204, (iv) a master-in-slave-out (MISO) connector 2028 for establishing a data line for data transfer from sensor 204 to controller 202, (v) a master-out-slave-in (MOSI) connector 2030 for establishing a data line for data transfer from controller 202 to sensor 204, and (vi) a chip select (CS) connector 2032 for establishing a line that enables selection of a particular sensor 204 from among a plurality of sensors connected to controller 202, for the purposes of transmitting data or control signals or instructions. Controller 202 additionally comprises a processing unit 2034 (or a processor) for implementing the one or more data processing functions and/or device control functions of controller 202.

Sensor 204 comprises (i) power (Vdd) connector 2042 for establishing a power line with controller 202 (through corresponding power (Vdd) connector 2022 located within controller 202), (ii) ground (Gnd) connector 2044 for establishing a ground connection with controller 202 (through corresponding ground (Gnd) connector 2024 located within controller 202), (iii) a clockline (SCL) connector 2046 for establishing a clockline with controller 202 and receiving a clock signal from controller 202 (through corresponding clockline (SCL) connector 2026 located within controller 202), (iv) a master-in-slave-out (MISO) connector 2048 for establishing a data line for data transfer from sensor 204 to controller 202 (through corresponding master-in-slave-out (MISO) connector 2028 located within controller 202), (v) a master-out-slave-in (MOSI) connector 2050 for establishing a data line for data transfer from controller 202 to sensor 204 (through corresponding master-out-slave-in (MOSI) connector 2030 located within controller 202), and (vi) a chip select (CS) connector 2052 for establishing a line that enables selection of a particular sensor 204 from among a plurality of sensors connected to controller 202 (through corresponding chip select (CS) connector 2032 located within controller 202). Sensor 204 additionally comprises one or more state sensing components 2054 for implementing the one or more state sensing functions of sensor 204. For example, in the event sensor 204 is an imaging sensor, the state sensing components 2054 may comprise one or more of photosensitive elements, microlenses, and/or filters disposed thereon, or in the event sensor 204 is an audio sensor, the state sensing components 2054 may include a vibration sensitive diaphragm or a microphone component.

While the illustration in FIG. 2 is directed towards an exemplary instance of a controller-sensor arrangement based on an SPI data interface, it would be understood that the types of controllers, sensors, data interfaces and connectors that are implemented within a controller-sensor arrangement can vary widely. As a result, the connectors and connection lines discussed in connection with FIG. 2 are to be understood as being non-limiting examples, and subject to changes in numbers, type and configurations based on the actual controller(s) and sensor(s) implemented within any specific arrangement.

FIG. 3 illustrates a more detailed embodiment of processing unit 2034 of controller 202. As shown, processing unit 2034 may comprise (i) a processor 20342 configured to enable and implement the data processing functions and/or control functions of processing unit 2034, (ii) a memory 20344 which may comprise transient memory and/or non-transient memory, (iii) a communication interface 20346 which enables processing unit 2034 to communicate with one or more other devices over any data interface or communication bus, (iv) a power supply 20348 which enables controller 202 to receive input power from a power source and/or to supply output power to one or more connected devices (for example, to sensor 204), (v) a control channel controller 20350 configured to enable transmission or receipt of control data to or from sensor 204 (for example through SCL connector 2026 or through CS connector 2032, and (vi) a data channel controller 20352 configured to enable data transfer to or from sensor 204 (for example through MISO connector 2028 or through MOSI connector 2030).

Conventional controller-sensor arrangements of the kind illustrated in FIGS. 1 to 3 suffer from multiple drawbacks that interfere with adding, substituting, swapping or hot-swapping of sensors into a functioning sensor system. Principally, for each sensor that a controller is connected to, such controller requires to implement a specific set of control instructions, operating instructions and/or data processing instructions—which set of instructions may vary significantly depending on the type and capabilities of the particular sensor that is coupled with the controller.

Ordinarily, since a sensor is hardwired into or is non-removably integrated with a corresponding controller, the type and capabilities of the particular sensor, or the correct set of control instructions, operating instructions and/or data processing instructions required by the controller for that sensor, can be specified or selected as part of the controller configuration process or at the time of integrating the sensor with the controller.

However, if a sensor is being dynamically added, or is being substituted in the place of another sensor, or is being swapped or hot-swapped into a system in a master-slave arrangement with a controller, the controller will need to be able to identify the sensor type and/or sensor capabilities before it can select a set of control instructions, operating instructions and/or data processing instructions that are needed to control and operate the sensor. Sensors themselves do not provide such identification information. Identification of a sensor type and/or sensor capabilities by the controller therefore ordinarily requires either specific user inputs that select the correct sensor type/sensor capabilities from among a list of sensor types/sensor capabilities, or requires the controller to analyse data received from the sensor and to determine the sensor type and/or sensor capabilities based the data received from such sensor. In either case, the process of identifying a sensor type and/or sensor capabilities is time consuming—and interferes with dynamic addition, substitution, swapping or hot-swapping of sensors into a sensor system.

There is accordingly a need for controller-sensor configurations which enable sensor devices to be readily added to or swapped or hot-swapped into or out of a sensor system.

SUMMARY

The invention relates to sensor systems, and controller-sensor arrangements and configurations. In particular, the invention provides methods, devices, systems and computer program products for implementing controller-sensor configurations which enable sensor devices to be readily added, substituted, swapped or hot-swapped into or out of a controller-sensor device arrangement.

BRIEF DESCRIPTION OF THE ACCOMPANYING DRAWINGS

DETAILED DESCRIPTION

The invention relates to sensor system arrangements and configurations. In particular, the invention provides methods, devices, systems and computer program products for implementing master-slave based or controller-sensor based configurations which enable sensor devices to be readily added, substituted, swapped or hot-swapped into or out of a controller-sensor device arrangement.

Figure 1:
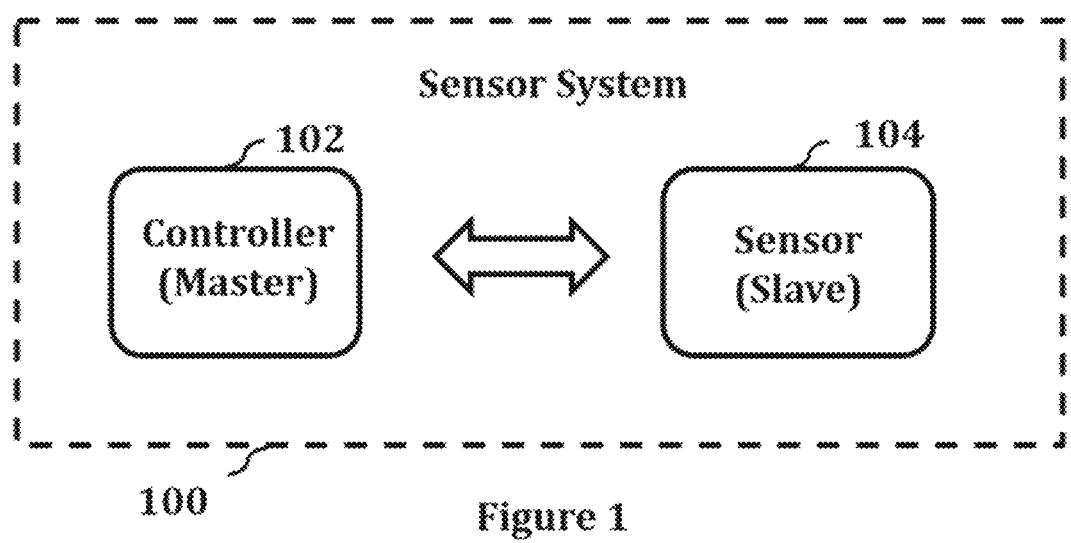
FIG. 1 illustrates a conventional sensor system comprising a controller and a sensor coupled in a master-slave configuration.
Figure 2:
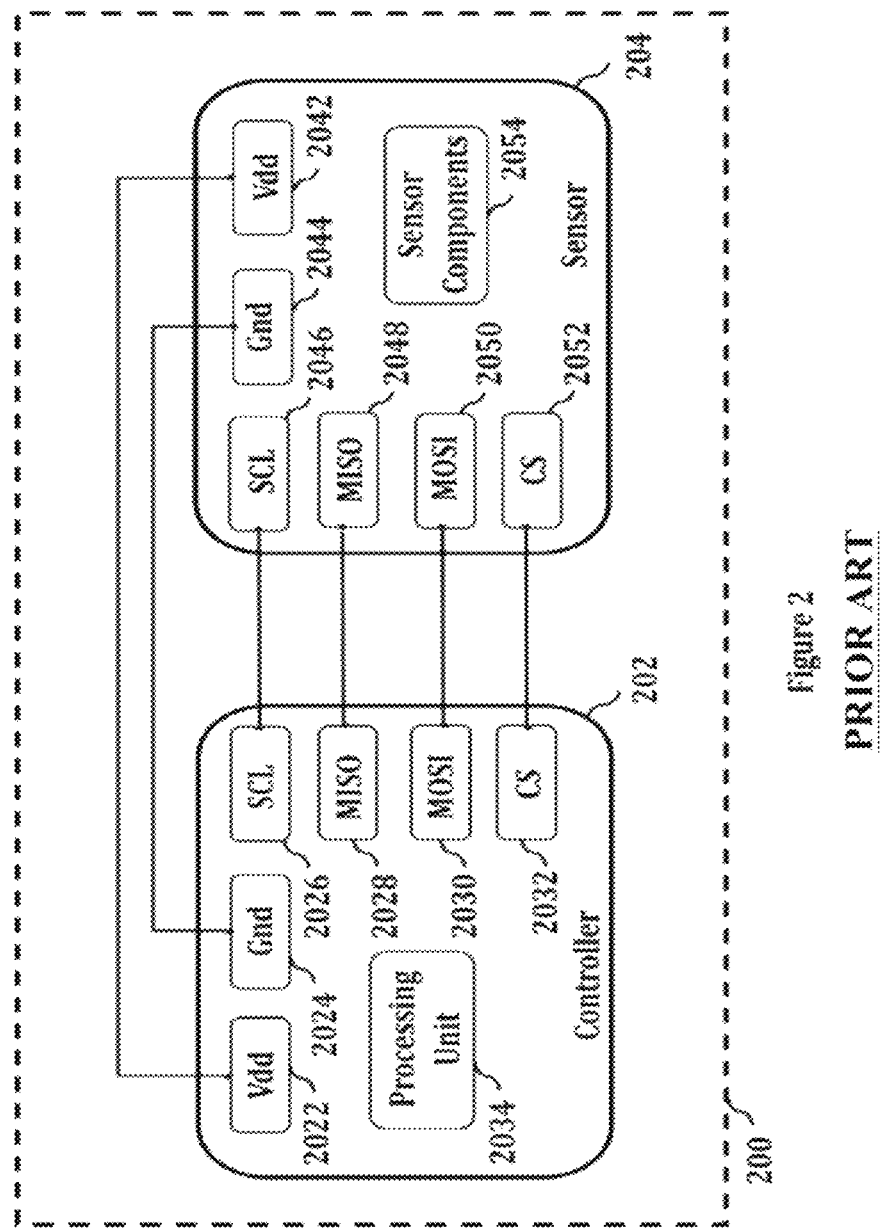
FIG. 2 illustrates in more detail, a conventional controller-sensor arrangement set up in a master-slave configuration.
Figure 3:
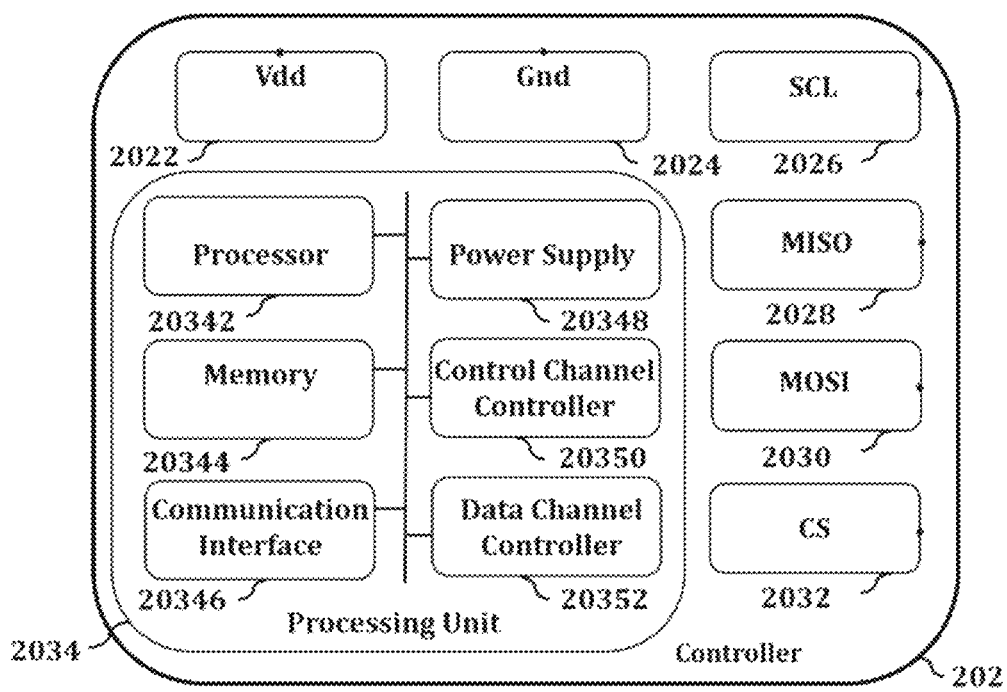
FIG. 3 illustrates an exemplary structure for a controller of a type that is capable of being implemented within the controller-sensor arrangement of FIG. 2.
Figure 4:
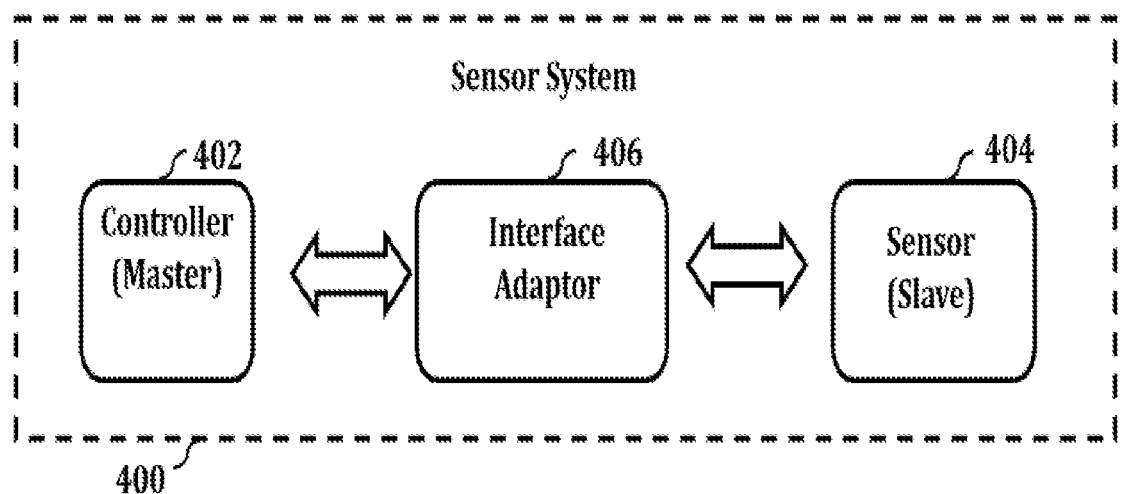
FIG. 4 illustrates a sensor system according to the teachings of the present invention comprising a controller, interface adaptor and sensor.

FIG. 4 illustrates a sensor system 400 according to the teachings of the present invention comprising a controller 402, an interface adaptor 406 and a sensor 404.

In an embodiment, controller 402 is configured to operate or function as a master device, while sensor 404 is configured to operate or function as a slave device. As discussed above, the term "master" or "master device" may be understood as any device having data processing capabilities (for example, a microcontroller, processor, computing device or central computer) and that is configured to control one or more slave devices and/or receive, process, aggregate or transmit, data received from one or more slave devices. The term "slave" or "slave device" may be understood as any peripheral device or sensor device having input functions, output functions or state sensing functions.

Each of controller 402 and sensor 404 is configured for communication with any communicably coupled device through a data interface (for example any of the Inter-Integrated Circuit (I2C) serial bus interface, the I3C serial bus interface, and/or the serial peripheral interface (SPI)) that enables receiving or transmitting data and/or control instructions.

Interface adaptor 406 comprises an adaptor component that communicably couples with controller 402 and with sensor 404—in a manner that enables interface adaptor 406 to function as a communication intermediary between the two, and to route signal(s), and/or data and/or control instructions received at interface adaptor 406 from either of controller 402 or sensor 404, onward to the other of sensor 404 and controller 402. Stated differently, interface adaptor 406 may be configured to connect to both of controller 402 and sensor 404 as a device positioned as an intermediate between the two, and is further configured to (i) enable signal transmission between controller 402 and sensor 404 through interface adaptor 406, (ii) route data and/or control instructions received from controller 402 to sensor 404 through interface adaptor 406, and/or (ii) route data and/or control instructions or responses received from sensor 404 to controller 402 through interface adaptor 406.

Interface adaptor 406 is an adaptor component that provides a conductive path between controller 402 and sensor 404—such that or data and/or control instructions and/or power and/or any other signal(s) can be transmitted and routed between controller 402 and sensor 404 through interface adaptor 406.

In one embodiment of the invention, interface adaptor 406 comprises a mounting adaptor that is configured to communicably interface with (or be mounted on) controller 402, while simultaneously enabling sensor 404 to communicably interface with or to be mounted onto said interface adaptor 406. In an embodiment, interface adaptor 406 comprises a substrate or a printed circuit board, either within or without a housing, having (i) a first set of connectors configured to enable interface adaptor 406 to interface with corresponding connectors of controller 402, (ii) a second set of connectors configured to enable interface adaptor 406 to interface with corresponding connectors of sensor 404, and (iii) one or more sets of circuitry or conductive traces that connect two or more connectors and/or components within interface adaptor 406—and which therefore define conductive paths between said connectors and/or components provided on interface adaptor 406. Interface adaptor 406 may be configured so as to enable coupling with controller 402 and simultaneously to enable sensor 404 to be coupled with interface adaptor 406.

Each of the connectors within interface adaptor 406 may include on or more electrical contact point(s)—each electrical contact point comprising a conductive point on the interface adaptor 406, such that a conductive connection is formed when the electrical contact point makes contact with an electrical terminal or an electrical connector or a corresponding electrical contact point on either of controller 402 and sensor 404.

As discussed above, in certain embodiments interface adaptor 406 comprises a substrate or printed circuit board having a plurality of connectors integrated thereon. The substrate or printed circuit board can include one or more non-conductive substrates formed, for instance, from material such as silicon, silicon dioxide, aluminum oxide, sapphire, germanium, gallium arsenide, an alloy of silicon and germanium, or indium phosphide, or various other suitable materials. The printed circuit board or substrate can be a single-sided circuit board, a double-sided circuit board, or a multi-layered circuit board. The substrate or printed circuit board can include various circuit configurations to couple connectors thereon with one or more other connectors, or with a controller, or with a sensor, or with one or more electrical components. The substrate printed circuit board may include various circuit patterns, which can be implemented using conductive traces, pads, electrical contact points, and/or various suitable electrical components (e.g. resistors, capacitors, transistors, diodes, integrated circuit chips, etc.) In an embodiment, the circuit patterns can be, at least in part, etched from copper sheets laminated onto a substrate. It will however be appreciated that various other suitable printed circuit board materials, designs, and/or manufacturing techniques can be used without deviating from the scope of the present disclosure. The substrate or printed circuit board may be partially or wholly mounted upon or within a housing or casing.

The connectors on interface adaptor 406 can be miniaturized, point connectors or right angle connectors, although various other suitable connector types can be used. The connectors can have various suitable contact point configurations, such as a single point contact configuration, two contact point configuration, three contact point configuration, four contact point configuration, etc. In particular, the contact point configuration of connectors can be selected based at least in part on a configuration of either of the controller 402 or the sensor 404 that is intended to be coupled with such connector(s)—so as to ensure that the controller 402 or the sensor 404 can be properly coupled with interface adaptor 406.

The configuration of interface adaptor 406, and the connectors and conductive traces or conductive lines provided thereon are such that when the interface adaptor 406 is coupled to both controller 402 and sensor 404, said interface adaptor 406 ensures that the controller 402 and sensor 404 are connected in a master-slave arrangement.

Figure 5:
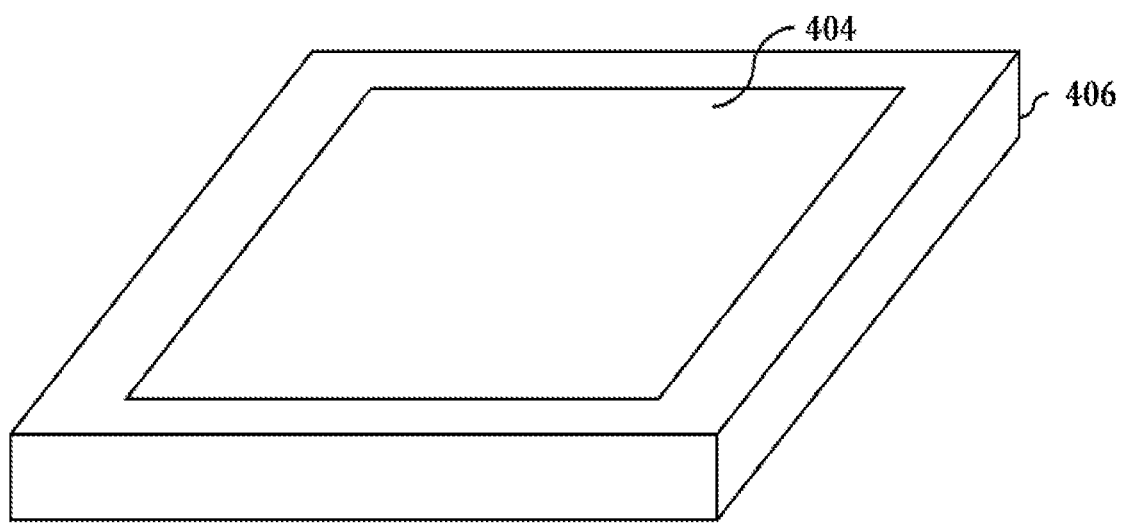
FIGS. 5 to 7 are exemplary illustrations of an interface adaptor coupled with a sensor.
Figure 6:
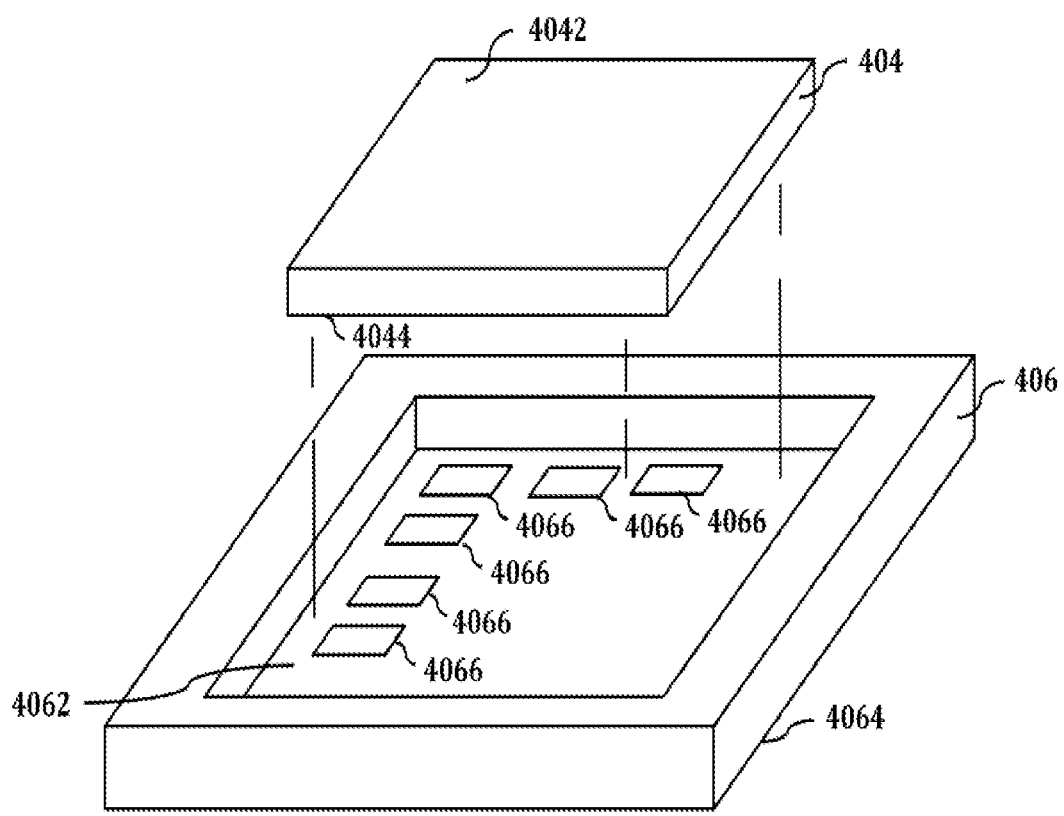
Figure 7:
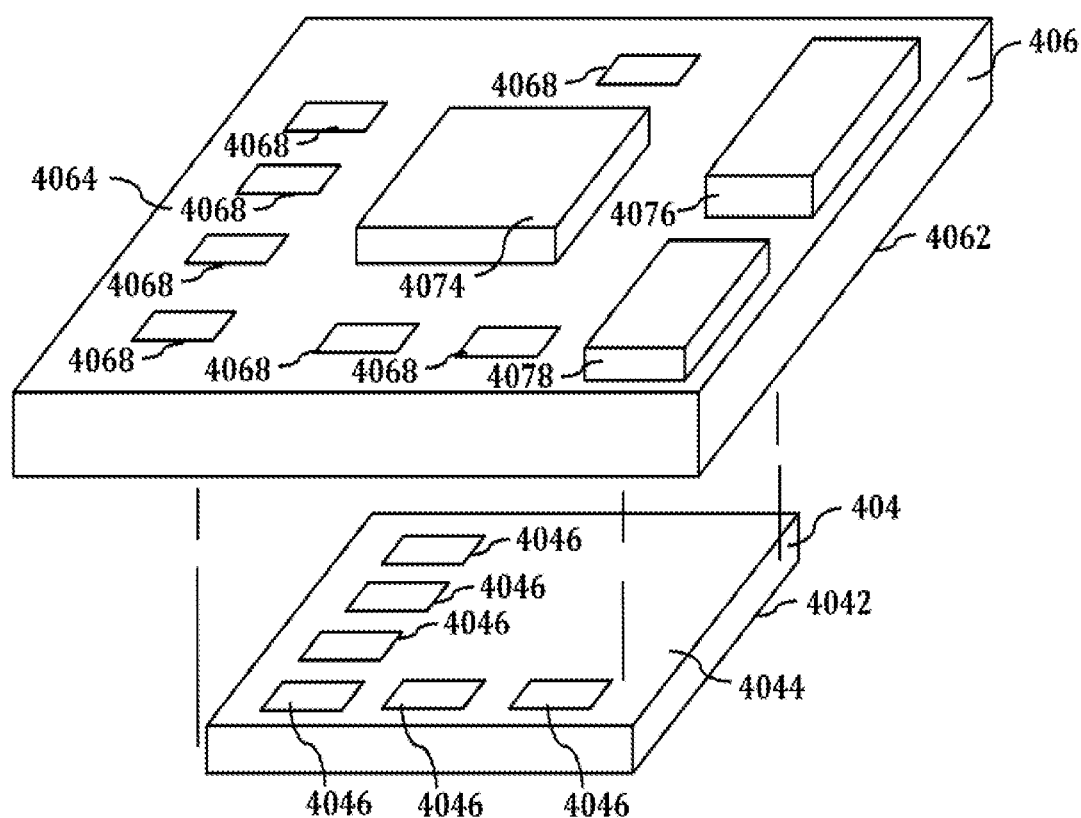

FIGS. 5 to 7 are exemplary illustrations of an interface adaptor 406 coupled with a sensor 404.

Interface adaptor 406 may comprise an adaptor body or adaptor plate or adaptor housing configured to simultaneously interface or mate with a sensor 404 as well as with a controller 402—so as to enable sensor 404 to be coupled with controller 402 through interface adaptor 406.

Sensor 404 comprises a sensor body having at least a first surface 4042 and a second surface 4044. First surface 4042 may comprise a surface with one or more state sensing elements or state sensing components disposed thereon. For example, in the event sensor 404 is an image sensor, first surface 4042 may have one or more of photosensitive sensors, microlenses, and/or filters disposed thereon. Second surface 4044 comprises a plurality of connectors 4046 disposed thereon, which connectors are configured to enable sensor 404 to interface with corresponding connectors within another device (for example, within a controller 402, or within an interface adaptor 406) and to receive or transmit signals or data instructions/control instructions from or to such other device through connectors 4046. In the embodiments illustrated in FIGS. 5 to 7, sensor 404 has six connectors 4046 disposed on second surface 4044. However, it would be understood that the total number of such connectors can be either greater or lesser than the number of connectors shown in the Figures. Likewise, the placement, size and configuration of the connectors disposed on sensor 404 can vary significantly. In an embodiment, one or more of the number, placement, size, configuration and functionality of the connectors disposed on sensor 404 may be dependent on functionality of sensor 404 and/or the data interface that sensor 404 implements for receiving or transmitting signal(s)/data and/or control instructions.

Interface adaptor 406 comprises an adaptor body having at least a first surface 4062 and a second surface 4064. First surface 4062 of interface adaptor 406 may comprise a surface that is configured to partially or wholly house or be housed within, or interface with or mate with sensor 404. In an embodiment, first surface 4062 may be configured to house, interface with or mate with second surface 4044 of sensor 404. Said first surface 4062 of interface adaptor 406 comprises a plurality of connectors 4066 disposed thereon, which connectors are configured to enable interface adaptor 406 to interface with corresponding connectors on sensor 404 (for example, with connectors 4046 disposed on second surface 4044 of sensor 404) and to receive or transmit signals from or to sensor 404 through connectors 4066. While in the embodiments illustrated in FIGS. 5 to 7, first surface 4062 of interface adaptor 406 has six connectors 4066 disposed thereon, it would be understood that the total number of such connectors can be either greater or lesser than the number of connectors shown in the figures. Likewise, the placement, size and configuration of the connectors 4066 disposed on first surface 4062 of interface adaptor 406 can vary significantly. In an embodiment, one or more of the number, placement, size, configuration and functionality of the connectors 4066 disposed on first surface 4062 of interface adaptor 406 may be dependent on the functionality of interface adaptor 406 and/or on the number, placement, size and functionality of the corresponding connectors 4046 that are disposed on second surface 4044 of sensor 404—so as to enable communication or signalling between sensor 404 and interface adaptor 406.

Second surface 4064 of interface adaptor 406 may comprise a surface that is configured to partially or wholly house or to be partially or wholly housed within, or to interface with or mate with controller 402. Said second surface 4064 of interface adaptor 406 may comprises a plurality of connectors 4068 disposed thereon, which connectors are configured to enable interface adaptor 406 to interface with corresponding connectors on controller 402 and to receive or transmit signals from or to controller 402 through connectors 4068. While in the embodiments illustrated in FIGS. 5 to 7, second surface 4064 of interface adaptor 406 has seven connectors 4068 disposed thereon, it would be understood that the total number of such connectors can be either greater or lesser than the number of connectors 4068 shown in the figures. Likewise, the placement, size and configuration of the connectors 4068 disposed on second surface 4064 of interface adaptor 406 can vary significantly. In an embodiment, one or more of the number, placement, size, configuration and functionality of the connectors 4068 disposed on second surface 4064 of interface adaptor 406 may be dependent on the functionality of interface adaptor 406 and/or the number, placement, size and functionality of the corresponding connectors that are disposed on or that provide connections with controller 402—so as to enable communication or signalling between controller 402 and interface adaptor 406.

As shown in FIG. 7, interface adaptor 406 may additionally have thereon or integrated therein, processor 4074, slave device identification controller 4076 and/or power regulator 4078.

Slave device identification controller 4076 comprises a processor or an integrated circuit (for example, an application specific integrated circuit) configured to retrievably store data identifying or describing a sensor 404 that has been interfaced or mated with interface adaptor 406—and further configured to transmit such data to controller 402. In an embodiment, the data identifying or describing sensor 404 may be stored in a memory within the interface adaptor. The data identifying or describing sensor 404 may comprise data or information describing any one or more of sensor type, a unique sensor ID, sensor manufacturer, sensor model number, sensor revision number, data bus or data interface incorporated by sensor 404 and any of a number, placement, size, configuration and functionality of connectors disposed on sensor 404.

It would be understood that the data identifying or describing sensor 404 may be acquired by slave device identification controller 4076 in a number of different ways. In an embodiment where interface adaptor 406 is a dedicated interface adaptor 406 that is specifically configured to serve as an adaptor interface for a particular sensor, the data identifying or describing sensor 404 may be pre-stored within a memory that is accessible by said slave device identification controller 4076 at the time of manufacture or configuration. In another embodiment, slave device identification controller 4076 may obtain such data through analysis of information received during a query-response communication session with sensor 404—for example, when sensor 404 is coupled with interface adaptor 406. Thereafter this information may be stored in a memory accessible by slave device identification controller 4076 for future retrieval and use.

It would be understood that as a consequence of integrating a slave device identification controller 4076 within interface adaptor 406, said interface adaptor 406 is configured to obtain and retrievably store within a local memory (within interface adaptor 406) data identifying or describing a sensor 404 that has been interfaced with or mated with interface adaptor 406. As a result, when interface adaptor 406 is coupled with a controller 402 (for example, when an interface adaptor—sensor combination is dynamically added to, substitutably or swappably coupled with controller 402 in place of a previously coupled sensor or interface adaptor-sensor combination, or is hot-swapped into a coupled arrangement with a controller 402 in place of a previously coupled sensor or interface adaptor-sensor combination, the identity of sensor 404 is not opaque or indeterminable to controller 402. Instead, when a controller 402 is coupled with an interface adaptor-sensor (406, 404) combination, the slave device identification controller 4076 within interface adaptor 406 transmits to controller 402, data identifying or describing sensor 404 (for example, data describing any one or more of sensor type, a unique sensor ID, sensor manufacturer, sensor model number, sensor revision number, data bus or data interface incorporated by sensor 404 and any of a number, placement, size, configuration and functionality of connectors disposed on sensor 404.

Controller 402 receives this data from interface adaptor 406 and may use such data to identify sensor 404 and/or its sensor capabilities—and to implement based on the identified sensor 404 or identified sensor capabilities, an appropriate set of control instructions, operating instructions and/or data processing instructions that are subsequently used by controller 402 to control or operate sensor 404. This has been found to significantly speed up addition, substitution, swapping or hot-swapping of sensors into a system configured according to a master-slave configuration.

Processor 4074 within interface adaptor 406 may be configured to implement one or more data processing operations on state data received at interface adaptor 406 from sensor 404—prior to transmitting such state data onward to controller 402. In an embodiment, processor 4074 may be configured to implement any of state data translation, state data transcoding, state data downsampling, state data format conversion, generation of a high dynamic range (HDR) data signal or data output based on a plurality of data signals or data inputs received from sensor 404, and/or conversion of data or a data signal received over a first data bus or first data communication standard from sensor 404, to data or a data signal configured for transmission over a second data bus or second data communication standard (that is different from the first data bus or first data communication standard) to controller 402. As a result of the localized processing capabilities provided within interface adaptor 406, said interface adaptor 406 reduces the data processing load on controller 402—thereby optimizing the ability of controller 402 to simultaneously handle data received from a plurality of sensors 404.

Power regulator 4078 comprises a controller or regulator configured to draw input power from a power source provided within or through controller 402 and to step up or step down the input power from a first voltage and/or first current and/or first frequency received from the input power source, to a second voltage and/or second current and/or second frequency required by sensor 404—and to transmit an output power signal at the second voltage and/or second current to sensor 404.

As a result of implementing a power regulator 4078 within interface adaptor 406, any sensor 404 having input power requirements that are different from the power supply within or coupled with controller 402, can nevertheless receive power having the correct power parameters (i.e. correct voltage and/or current) through power regulator 4078. As a result, controller 402 needs to simply provide a standardized power signal to all sensors that are coupled thereto, regardless of the input power requirements of each individual sensor—and the generation of a power signal that is appropriate to each sensor's power requirements is managed by power regulator 4078 within input adaptor 406. This has been found to further contribute to modularity of the sensor system.

Figure 8:
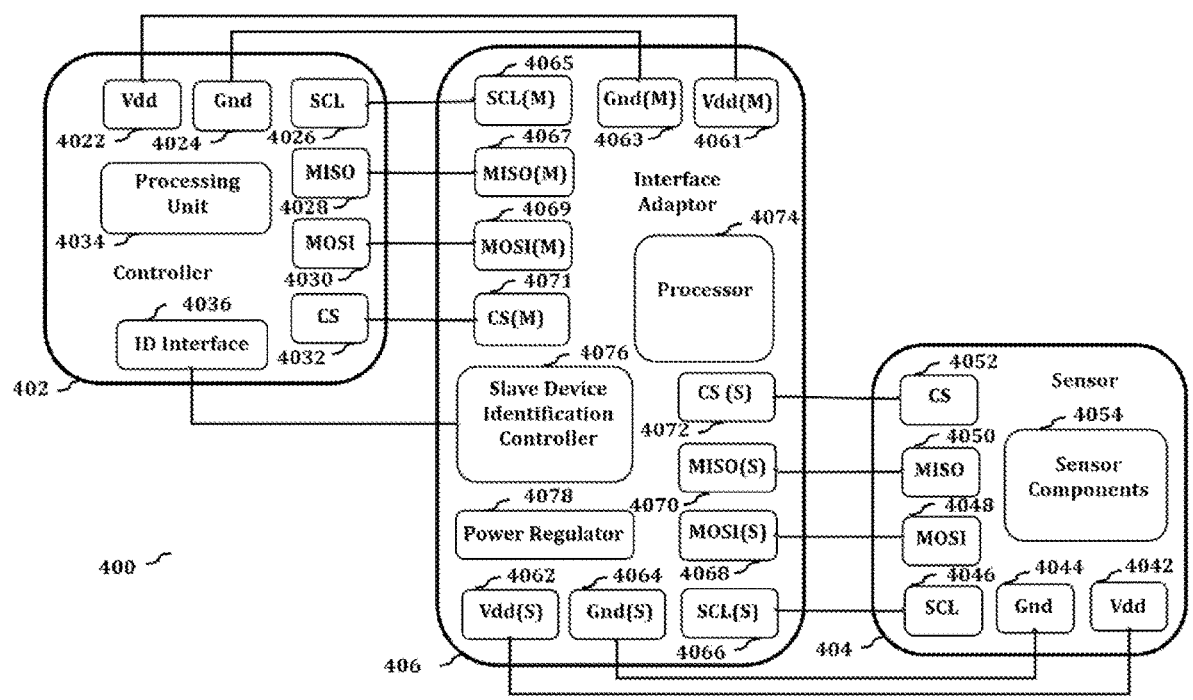
FIG. 8 illustrates in more detail, an exemplary arrangement of a controller, interface adaptor and sensor according to FIG. 4, with exemplary data and control interconnections therebetween.

FIG. 8 illustrates in more detail, exemplary sensor system 400 of FIG. 4, comprising controller 402, interface adaptor 406 and sensor 404. The arrangement illustrated in FIG. 8 comprises controller 402 and sensor 404 in a master-slave configuration, with interface adaptor 406 positioned as a communication intermediate between the two (402, 404)—and enabling transmission of power, data and/or control signals between the two. While FIG. 8 shows both of controller 402 and sensor 404 being configured to communicate through an SPI data interface, it would be understood that as a result of the particular capabilities of interface adaptor 406 (as discussed above) both of controller 402 and sensor 404 can implement any alternate data interface capabilities, and in an embodiment controller 402 may have different data interface capabilities from sensor 404.

As shown in FIG. 8, controller 402 comprises (i) power (Vdd) connector 4022 for establishing a power output line to interface adaptor 406, (ii) ground (Gnd) connector 4024 for establishing a ground connection with interface adaptor 406, (iii) a clockline (SCL) connector 4026 for establishing a clockline with interface adaptor 406 and generating and transmitting a clock signal to interface adaptor 406, (iv) a master-in-slave-out (MISO) connector 2028 for establishing a data line for data transfer from interface adaptor 406 to controller 402, (v) a master-out-slave-in (MOSI) connector 4030 for establishing a data line for data transfer from controller 402 to interface adaptor 406, and (vi) a chip select (CS) connector 4032 for establishing a line that enables selection of a particular interface adaptor 406 and/or sensor 404 from among a plurality of interface adaptors and/or sensors and/or slave devices connected to controller 402.

Controller 402 additionally may comprise a processing unit 4034 (or processor) for implementing the one or more data processing functions and/or device control functions of controller 402.

Yet further, controller 402 may include an ID interface 4036 (with a corresponding ID interface connector) for receiving data from a slave device identification controller 4076 within interface adaptor 406—wherein the received data identifies or describes a sensor 404 that is correspondingly coupled with interface adaptor 406 (for example, data or information describing any one or more of sensor type, a unique sensor ID, sensor manufacturer, sensor model number, sensor revision number, data bus or data interface incorporated by sensor 404 and any of a number, placement, size, configuration and functionality of connectors disposed on sensor 404.

Sensor 404 comprises (i) power (Vdd) connector 4042 for establishing a power input line from interface adaptor 406, (ii) ground (Gnd) connector 4044 for establishing a ground connection with interface adaptor 406, (iii) a clockline (SCL) connector 4046 for establishing a clockline with interface adaptor 406 and for receiving a clock signal from interface adaptor 406, (iv) a master-out-slave-in (MOSI) connector 4048 for establishing a data line for data transfer from sensor 404 to interface adaptor 406, (v) a master-in-slave-out (MISO) connector 4050 for establishing a data line for data transfer from interface adaptor 406 to sensor 404, and (vi) a chip select (CS) connector 4052 for establishing a line that enables selection of a particular sensor 404 from among a plurality of interface adaptors and/or sensor and/or slave devices connected to controller 402.

Sensor 404 may further include sensor components 4054—which sensor components comprise one or more state sensing elements or state sensing components disposed within sensor 404. For example, in the event sensor 404 is an image sensor, sensor components 4054 may include one or more of photosensitive sensors, microlenses, and/or filters disposed on or within sensor 404.

Interface adaptor 406 comprises (i) power (Vdd(M)) connector 4061 for establishing a power line with controller 402 (through corresponding power (Vdd) connector 4022 located within controller 402), (ii) ground (Gnd(M)) connector 4063 for establishing a ground connection with controller 402 (through corresponding ground (Gnd) connector 4024 located within controller 402), (iii) a clockline (SCL(M)) connector 4065 for establishing a clockline with controller 402 and receiving a clock signal from controller 402 (through corresponding clockline (SCL) connector 4026 located within controller 402), (iv) a master-in-slave-out (MISO(M)) connector 4067 for establishing a data line for data transfer from interface adaptor 406 to controller 402 (through corresponding master-in-slave-out (MISO) connector 4028 located within controller 402), (v) a master-out-slave-in (MOSI(M)) connector 4069 for establishing a data line for data transfer from controller 402 to interface adaptor 406 (through corresponding master-out-slave-in (MOSI) connector 4030 located within controller 402), and (vi) a chip select (CS(M)) connector 4071 for establishing a line that enables selection of an interface adaptor 406/sensor 404 from among a plurality of interface adaptors or sensors connected to controller 402 (through corresponding chip select (CS) connector 4032 located within controller 402).

Interface adaptor 406 additionally comprises (vii) power (Vdd(S)) connector 4062 for establishing a power line with sensor 404 (through corresponding power (Vdd) connector 4042 located within sensor 404), (ii) ground (Gnd(S)) connector 4064 for establishing a ground connection with sensor 404 (through corresponding ground (Gnd) connector 4044 located within sensor 404), (iii) a clockline (SCL(S)) connector 4066 for establishing a clockline with sensor 404 and transmitting a clock signal to sensor 404 (through corresponding clockline (SCL) connector 4046 located within sensor 404)—and which clock signal may in turn be based on or may replicate the clock signal received by interface adaptor 406 from controller 402, (iv) a master-out-slave-in (MOSI(S)) connector 4068 for establishing a data line for data transfer from interface adaptor 406 to sensor 404 (through corresponding master-out-slave-in (MOSI) connector 4048 located within sensor 404)—and wherein the data received over said data line may be further transferred to controller 402 by interface adaptor 406, (v) a master-in-slave-out (MISO(S)) connector 4070 for establishing a data line for data transfer from sensor 404 to interface adaptor 406 (through corresponding master-in-slave-out (MISO) connector 4050 located within sensor 404)—and wherein the data transmitted over said data line may comprise data received from controller 402, and (vi) a chip select (CS(S)) connector 4072 for establishing a line that enables selection of sensor 404 from among a plurality of sensors connected to controller 402 (through corresponding chip select (CS) connector 4052 located within sensor 404)—and wherein the selection of sensor 404 may be based on selection data received at interface adaptor 406 from controller 402.

Interface adaptor may additionally include processor 4074, slave device identification controller 4076 and/or power regulator 4078—the configuration and functionality whereof has been previously discussed in connection with FIG. 7.

As shown in FIG. 8, a data line may be provided between ID interface 4036 within controller 402 and slave device identification controller 4076 to enable slave device identification controller 4076 to transmit to ID interface 4036, data identifying or describing a sensor 404 that is correspondingly coupled with interface adaptor 406 (for example, data or information describing any one or more of sensor type, a unique sensor ID, sensor manufacturer, sensor model number, sensor revision number, data bus or data interface incorporated by sensor 404 and any of a number, placement, size, configuration and functionality of connectors disposed on sensor 404.

Figure 9:
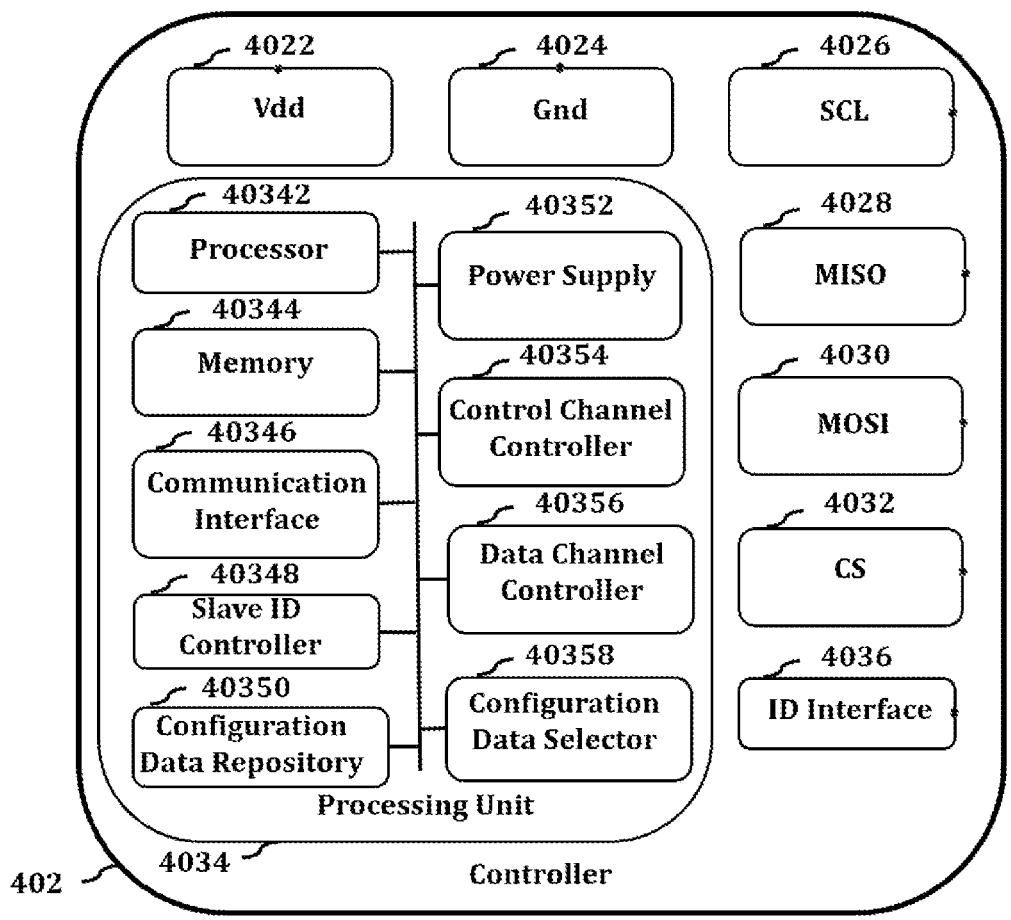
FIG. 9 illustrates an exemplary structure for a controller of a type that is capable of being implemented within the arrangement of FIGS. 4 and 8.

FIG. 9 illustrates a more detailed embodiment of processing unit 4034 of controller 402. As shown, processing unit 4034 may comprise (i) a processor 40342 configured to enable and implement the data processing functions and/or control functions of processing unit 4034, (ii) a memory 40344 which may comprise either transient memory or non-transient memory, (iii) a communication interface 40346 which enables processing unit 4034 to communicate with one or more other devices over any data interface or communication bus, (iv) a slave ID controller 40348 configured to receive through ID interface 4036 of controller 402, data identifying or describing a sensor 404 that is correspondingly coupled with interface adaptor 406 (for example, data or information describing any one or more of sensor type, a unique sensor ID, sensor manufacturer, sensor model number, sensor revision number, data bus or data interface incorporated by sensor 404 and any of a number, placement, size, configuration and functionality of connectors disposed on sensor 404—and to identify sensor 404 based on the received data, (v) a configuration data repository 40350 having stored therewithin, a plurality of sets of control instructions, operating instructions and/or data processing instructions that are respectively selectable in response to determining that a particular sensor or sensor type has been coupled with controller 402 (for example through interface adaptor 406), (vi) a power supply 40352 which enables controller 402 to receive power from a power source and/or to supply power to one or more connected devices (for example, to interface adaptor 406, and through interface adaptor 406 to sensor 404), (vii) a control channel controller 40354 configured to effect transmission or receipt of control data to or from sensor 404 (for example through SCL connector 4026 or through CS connector 4032, (viii) a data channel controller 40356 configured to effect data transfer to or from interface adaptor 406 (for example through MISO connector 4028 or through MOSI connector 4030), and (ix) a configuration data selector 40358 configured to select from the configuration data repository 40350 a set of control instructions, operating instructions and/or data processing instructions that correspond to operation or functioning of a particular sensor or sensor type has been coupled with controller 402 (for example through interface adaptor 406).

The invention additionally provides methods for adding a sensor within a sensor system configured according to a master-slave configuration of the kind described above. In an embodiment, the method comprises the steps of:

coupling an interface adaptor 406 with a controller 402, wherein interface adaptor is also coupled with sensor 404—in a manner that enables interface adaptor 406 to function as a communication intermediary between controller 402 and sensor 404, and to route signal(s), and/or data and/or control instructions received at interface adaptor 406 from either of controller 402 or sensor 404, onward to the other of sensor 404 and controller 402. In an embodiment, interface adaptor may be coupled to both controller 402 and sensor 404 in a manner that ensures that controller 402 and sensor 404 are connected in a master-slave arrangement (controller 402 functioning as the master device, and sensor 404 functioning as the slave device).

subsequent to, or responsive to, coupling controller 402 with interface adaptor 406), transmitting from slave device identification controller 4076 (within interface adaptor 406) to controller 402, data identifying or describing sensor 404. The data identifying or describing sensor 404 may comprise data or information describing any one or more of sensor type, a unique sensor ID, sensor manufacturer, sensor model number, sensor revision number, data bus or data interface incorporated by sensor 404 and any of a number, placement, size, configuration and functionality of connectors disposed on sensor 404.

identifying at controller 402, an identity or a type or one or more sensor capabilities of sensor 404, wherein the identification is implemented based on the data received from slave device identification controller 4076 and/or interface adaptor 406 in the immediately preceding step.

selecting at controller 402, a specific set of control instructions, operating instructions and/or data processing instructions (from among a plurality of control instructions, operating instructions and/or data processing instructions that are retrievably stored for access by controller 402), wherein the selected set of instructions are associated with the identity, type or sensor capabilities of sensor 404 that have been identified at controller 402 in the immediately preceding step.

loading into a transitory memory, volatile memory, or random access memory of controller 402, the specific set of control instructions, operating instructions and/or data processing instructions that have been selected by controller 402.

implementing operation or control of sensor 404 by controller 402 based on the specific set of control instructions, operating instructions and/or data processing instructions that have been selected by controller 402.

In an embodiment of the method described above, subsequent to coupling of controller 402 and sensor 404 through interface adaptor 406, sensor 404 transmit through interface adaptor 406 and onward to controller 402, state data captured by sensor 404 that corresponds to a detected state of an environment-of-interest or region-of-interest.

In a further embodiment of the method, a processor 4074 within interface adaptor 406 implements one or more data processing operations on said state data at interface adaptor 406 prior to transmitting the state data to controller 402. The data processing operations may comprise any one or more of state data translation, state data transcoding, state data downsampling, state data format conversion, generation of a high dynamic range (HDR) data signal or data output based on a plurality of data signals or data inputs received from sensor 404, and/or conversion of data or a data signal received over a first data bus or first data communication standard from sensor 404, to data or a data signal configured for transmission over a second data bus or second data communication standard (that is different from the first data bus or first data communication standard) to controller 402.

The translated state data is received at controller 402 and is used by controller 402 for one or more of the controller's control functions, operating functions and/or data processing functions, or may be transmitted onward from controller 402 to another device or processor.

In a method embodiment, subsequent to coupling of controller 402 with sensor 404 through interface adaptor 406, interface adaptor 406 may receive from controller 402 or from a power supply, input power for onward transmission to sensor 404—wherein the received input power may have one or more power signal parameters (e.g. voltage, current, frequency) that are incompatible or inconsistent with power signal parameters that are required by sensor 404 for operation. The method comprises modifying (at interface adaptor 406 or more particularly at a power regulator 4078 within interface adaptor 406) the received input power by stepping up or stepping down the input power from a first voltage and/or first current and/or first frequency received from the input power source, to a second voltage and/or second current and/or second frequency required by sensor 404—and transmitting an output power signal at the second voltage and/or second current and/or second frequency to sensor 404.

Figure 10:
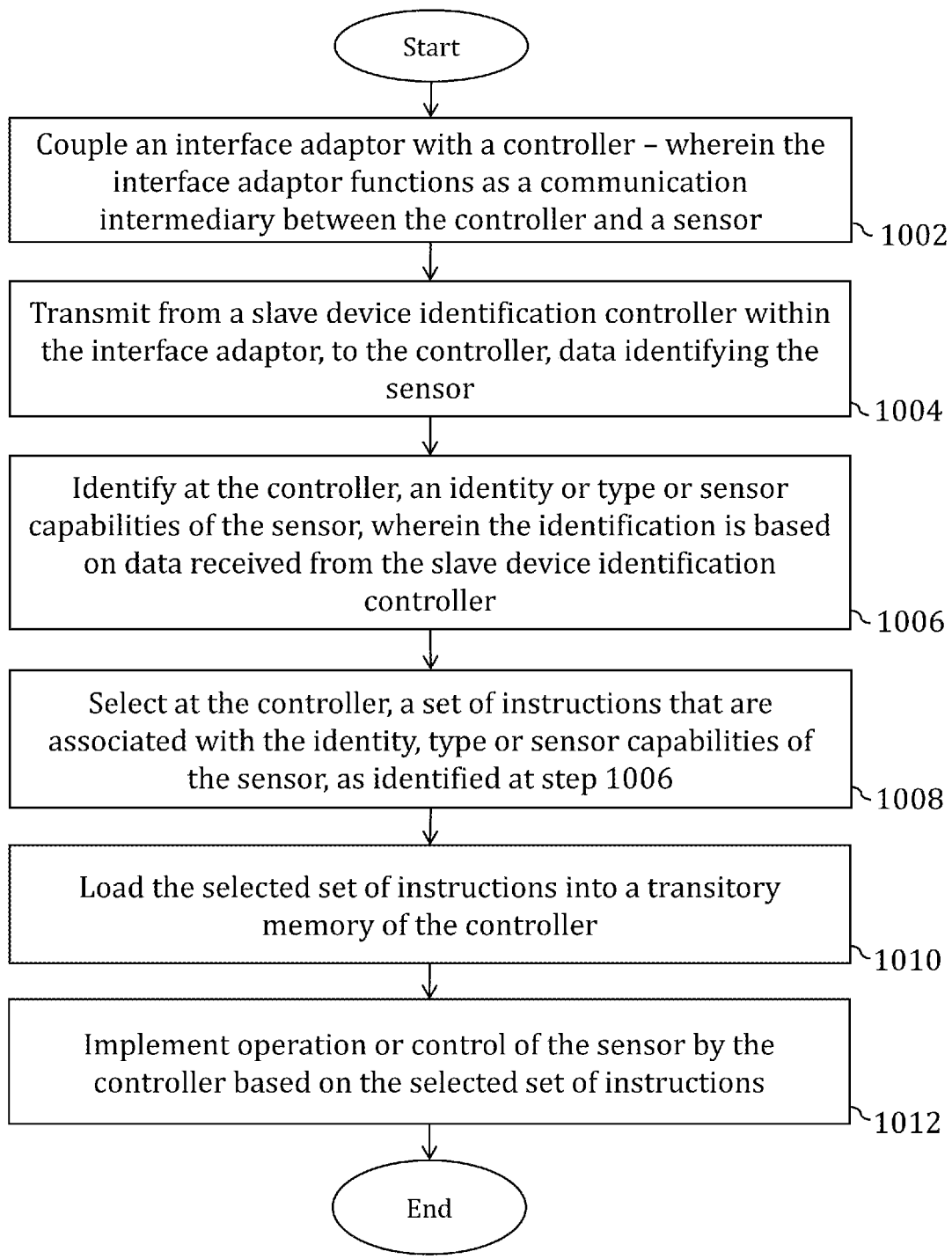
FIG. 10 is a flowchart illustrating a method for adding a sensor within a sensor system in accordance with the teachings of the present invention.

FIG. 10 is a flowchart illustrating a method for adding a sensor within a sensor system in accordance with the teachings of the present invention. The interface adaptor, sensor and controller of described in connection with the method steps of FIG. 10 may be configured according to any of the embodiments described above.

Step 1002 comprises coupling an interface adaptor with a controller—wherein the interface adaptor has in turn been coupled with a sensor, and the coupling between the interface adaptor and the controller enables the interface adaptor to function as a communication intermediary between the controller and the sensor, and further enables the controller and sensor to be communicably coupled in a master-slave arrangement.

Step 1004 comprises transmitting from a slave device identification controller within the interface adaptor, to the controller, data identifying the sensor.

Step 1006 comprises identifying at the controller, an identity, or type, or sensor capabilities corresponding to the sensor, wherein the identification is based on data received from the slave device identification controller.

Step 1008 comprises selecting at the controller, a set of instructions that are associated with the identity, type or sensor capabilities of the sensor, as identified at step 1006.

Step 1010 comprises loading the selected set of instructions into a transitory memory of the controller.

Step 1012 comprises implementing operation or control of the sensor by the controller based on the selected set of instructions.

The invention additionally provides a method for substituting, swapping or hot-swapping one or more sensors within a sensor system configured according to a master-slave configuration, as described herein. In an embodiment, the method comprises the steps of:

Decoupling a first interface adaptor (of a type described in connection with interface adaptor 406 above) and a first sensor (of a type described in connection with sensor 404 above) from a controller 402, coupling a second interface adaptor (of a type described in connection with interface adaptor 406 above) with controller 402, wherein the second interface adaptor is also coupled with a second sensor (of a type described in connection with sensor 404 above)—in a manner that enables the second interface adaptor to function as a communication intermediary between controller 402 and the second sensor, and to route signal(s), and/or data and/or control instructions received at the second interface adaptor from either of controller 402 or the second sensor, onward to the other of the second sensor and controller 402. In an embodiment, the second interface adaptor may be coupled to both controller 402 and the second sensor in a manner that ensures that controller 402 and the second sensor are connected in a master-slave arrangement (controller 402 functioning as the master device, and the second sensor functioning as the slave device).

subsequent to or responsive to coupling controller 402 with the second interface adaptor 406), transmitting from a slave device identification controller (of a type described in connection with slave device identification controller 4076 above, and that is provided within the second interface adaptor) to controller 402, data identifying or describing the second sensor. The data identifying or describing the second sensor may comprise data or information describing any one or more of sensor type, a unique sensor ID, sensor manufacturer, sensor model number, sensor revision number, data bus or data interface incorporated by the second sensor and any of a number, placement, size, configuration and functionality of connectors disposed on the second sensor.

identifying at controller 402, an identity or a type or one or more sensor capabilities of the second sensor, wherein the identification is implemented based on the data received from the slave device identification controller and/or the second interface adaptor in the immediately preceding step.

selecting at controller 402, a specific set of control instructions, operating instructions and/or data processing instructions (from among a plurality of control instructions, operating instructions and/or data processing instructions that are retrievably stored for access by controller 402), wherein the selected set of instructions are associated with the identity, type or sensor capabilities of the second sensor that have been identified at controller 402 in the immediately preceding step.

loading into a transitory memory, volatile memory, or random access memory of controller 402, the specific set of control instructions, operating instructions and/or data processing instructions that have been selected by controller 402. In an embodiment, this step may be preceded by discarding, removing or flushing from a transitory memory, volatile memory, or random access memory of controller 402, a set of control instructions, operating instructions and/or data processing instructions that have been previously selected and/or used by controller 402 for the purposes of controlling or operating the now-decoupled first sensor.

implementing operation or control of the second sensor by controller 402 based on the specific set of control instructions, operating instructions and/or data processing instructions that have been selected by controller 402 in the preceding step.

In an embodiment of the method described above, subsequent to coupling of controller 402 and the second sensor through the second interface adaptor, the second sensor transmit through the second interface adaptor and onward to controller 402, state data captured by the second sensor that corresponds to a detected state of an environment-of-interest or region-of-interest.

In a further embodiment of the method, a processor within the second interface adaptor implements one or more data processing operations on said state data at second interface adaptor prior to transmitting the state data to controller 402. The data processing operations may comprise any one or more of state data translation, state data transcoding, state data downsampling, state data format conversion, generation of a high dynamic range (HDR) data signal or data output based on a plurality of data signals or data inputs received from the second sensor, and/or conversion of data or a data signal received over a first data bus or first data communication standard from the second sensor, to data or a data signal configured for transmission over a second data bus or second data communication standard (that is different from the first data bus or first data communication standard) to controller 402.

The translated state data is received at controller 402 and is used by controller 402 for one or more of the controller's control functions, operating functions and/or data processing functions, or may be transmitted onward from controller 402 to another device or processor.

In a method embodiment, subsequent to coupling of controller 402 with the second sensor through the second interface adaptor, the second interface adaptor may receive from controller 402 or from a power supply, input power for onward transmission to the second sensor 404—wherein the received input power may have one or more power signal parameters (e.g. voltage, current, frequency) that are incompatible or inconsistent with power signal parameters that are required by the second sensor for operation. The method comprises modifying (at the interface adaptor 406 or more particularly at a power regulator (of a type described above as power regulator 4078) within the second interface adaptor) the received input power by stepping up or stepping down the input power from a first voltage and/or first current and/or first frequency received from the input power source, to a second voltage and/or second current and/or second frequency required by the second sensor—and transmitting an output power signal at the second voltage and/or second current and/or second frequency to the second sensor.

Figure 11:
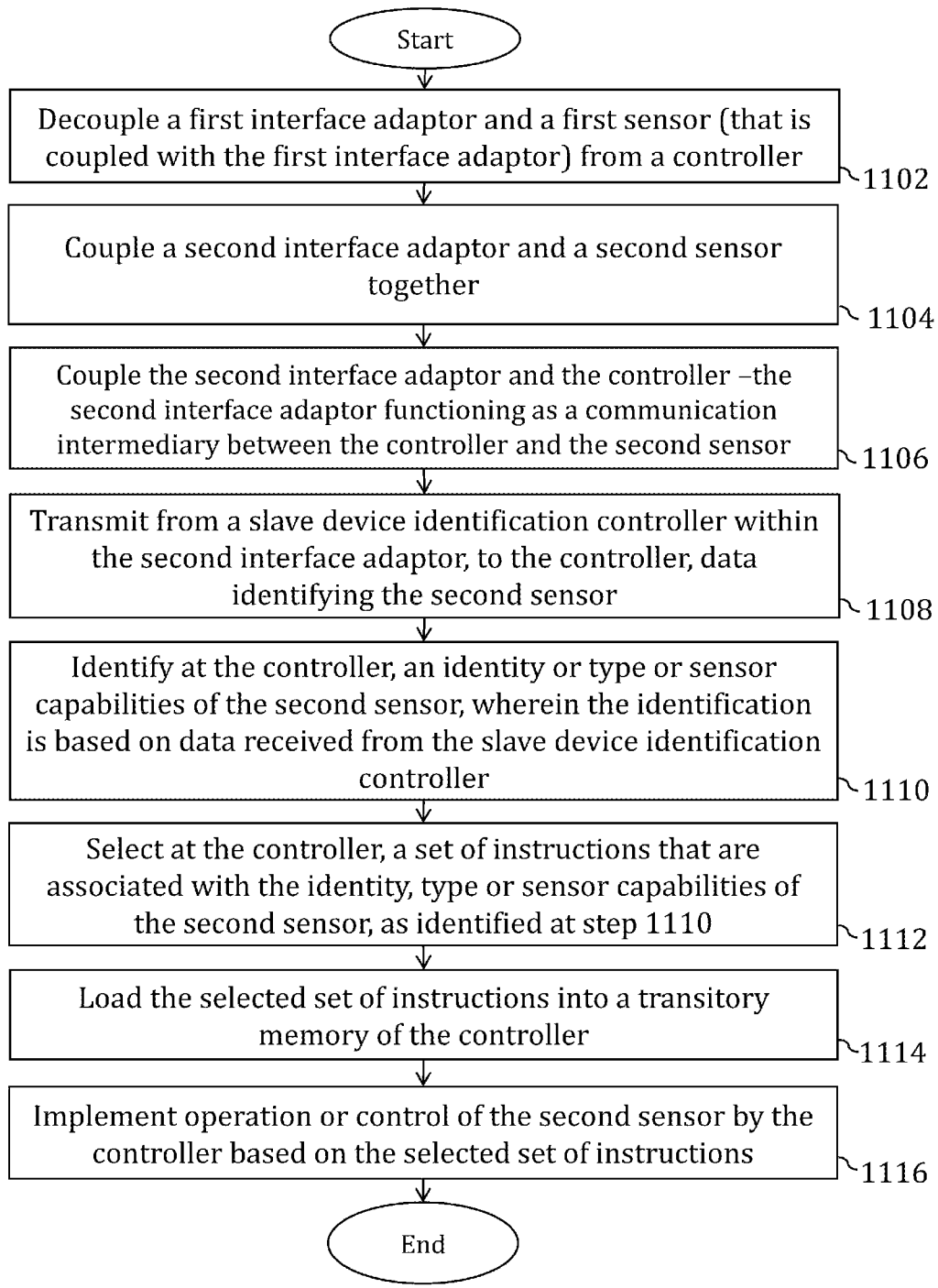
FIG. 11 is a flowchart illustrating a method for swapping sensors within a sensor system in accordance with the teachings of the present invention.

FIG. 11 is a flowchart illustrating a method for swapping sensors within a sensor system in accordance with the teachings of the present invention. The interface adaptor, sensor and controller of described in connection with the method steps of FIG. 11 may be configured according to any of the embodiments described above.

Step 1102 comprises decoupling a first interface adaptor and a first sensor (that is coupled with the first interface adaptor) from a controller.

Step 1104 comprises coupling a second interface adaptor and a second sensor together, such that the second interface adaptor functions as a communication intermediary between the controller and the second sensor, and wherein the second interface adaptor enables the controller and second sensor to be communicably coupled in a master-slave arrangement.

Step 1106 comprises coupling the second interface adaptor with the controller—wherein the second interface adaptor functions as a communication intermediary between the controller and the second sensor.

Step 1108 comprises transmitting from a slave device identification controller within the second interface adaptor, to the controller, data identifying the second sensor.

Step 1110 comprises identifying at the controller, an identity or type or sensor capabilities of the second sensor, wherein the identification is based on data received from the slave device identification controller.

Step 1112 comprises selecting at the controller, a set of instructions that are associated with the identity, type or sensor capabilities of the second sensor, as identified at step 1110.

Step 1114 comprises loading the selected set of instructions into a transitory memory of the controller.

Step 1116 comprises implementing operation or control of the second sensor by the controller based on the selected set of instructions.

The above described methods may by implemented using the sensor system(s) and/or interface adaptor(s) described above—and the methods may include specific method steps that have been described above as being implemented by the sensor system(s) and/or interface adaptor(s) or by one or more components thereof.

In an embodiment, the invention provides a sensor system, comprising an interface adaptor configured for communicable coupling with a controller and with a sensor, wherein the coupling with the controller and with the sensor enables the interface adaptor to function as a communication intermediary between the controller and the sensor for coupling the controller and the sensor in a master-slave configuration.

The interface adaptor comprises (i) an adaptor body that is configured to communicably interface with the controller and to communicably interface with the sensor, (ii) a first set of connectors configured for enabling the interface adaptor to interface with corresponding connectors of the controller, (iii) a second set of connectors configured for enabling the interface adaptor to interface with corresponding connectors of the sensor, (iv) one or more conductive paths connecting the connectors within the first set of connectors with connectors within the second set of connectors, and a slave device identification controller.

The slave device identification controller may be configured to (i) retrievably store data identifying the sensor that is interfaced with the interface adaptor, and (ii) to enable transmission of the data identifying the sensor, from the interface adaptor to the controller.

In an embodiment of the sensor system, the data identifying the sensor that is retrievably stored by the slave device identification controller comprises data describing any one or more of sensor type, a unique sensor ID, sensor manufacturer, sensor model number, sensor revision number, data bus or data interface incorporated by the sensor, or any of a number, placement, size, configuration and functionality of connectors disposed on the sensor.

In another embodiment of the sensor system the data identifying the sensor that is retrievably stored by the slave device identification controller (i) is pre-stored within a memory, that is accessible by the slave device identification controller, during manufacture of the interface adaptor, or (ii) is determined based on analysis of information received during a query-response communication session between the interface adaptor and the sensor.

The interface adaptor may include a processor configured to implement one or more data processing operations on state data received at the interface adaptor from the sensor, prior to onward transmission of such state data to the controller. In a particular embodiment of the sensor system, interface adaptor may be configured such that said data processing operations may comprise any of state data translation, state data transcoding, state data downsampling, state data format conversion, generation of a high dynamic range (HDR) data output based on a plurality of data signals received from sensor, and conversion of data received over a first data bus or a first data communication standard to data configured for transmission over a second data bus or second data communication standard.

The interface adaptor may include a power regulator, configured to (i) receive an input power signal from a power source within the controller, wherein the input power signal at a first voltage, first current and first frequency, and (ii) modulate the input power and transmit an output power signal to the sensor at a second voltage, second current and second frequency. At least one of the second voltage, second current and second frequency may be different from the first voltage, first current and first frequency.

In a particular embodiment, the sensor system may be configured such that the output power signal from the power regulator matches the voltage, current and frequency requirements of an input power signal required by the sensor.

The slave device identification controller may be configured such that when the sensor is coupled with the interface adaptor controller, the slave device identification controller responds to being coupled with the controller by transmitting the data identifying the sensor, to the controller.

In an embodiment of the sensor system (i) the interface adaptor is coupled with the sensor, (ii) the interface adaptor is coupled with the controller, or (iii) the interface adaptor is respectively coupled with each of the sensor and the controller.

In a particular embodiment of the sensor system, the controller may include one or more of (i) a processor, (ii) a power connector for establishing a power line with the sensor, (iii) a ground connector for establishing a ground connection with the sensor, (iv) a clockline connector for establishing a clockline with the sensor and for generating and transmitting a clock signal to the sensor, (v) a master-in-slave-out connector for establishing a data line for data transfer from the sensor to the controller, (vi) a master-out-slave-in connector for establishing a data line for data transfer from the controller to the sensor, (vii) a chip select connector for establishing a line that enables selection of a particular sensor from among a plurality of sensors connected to the controller and (viii) an ID interface for receiving data identifying the sensor, from the slave device identification controller.

In another embodiment, the sensor may include one or more of (i) a state sensing component, (ii) a power connector for establishing a power line with the controller, (iii) a ground connector for establishing a ground connection with the controller, (iv) a clockline connector for establishing a clockline with the controller and for receiving a clock signal from the controller, (v) a master-in-slave-out connector for establishing a data line for data transfer from the sensor to the controller, (vi) a master-out-slave-in connector for establishing a data line for data transfer from the controller to the sensor, and (vii) a chip select connector for establishing a line that enables selection of the sensor from among a plurality of sensors connected to the controller.

In a specific embodiment of the sensor system, the interface adaptor may comprise one or more of (i) a first power connector for establishing a power line with the controller, and a second power connector for establishing a second power line with the sensor, (ii) a first ground connector for establishing a ground connection with the controller and a second ground connector for establishing a ground connection with the sensor, (iii) a first clockline connector 4065 for establishing a clockline with the controller and for receiving a clock signal from the controller and a second clockline connector for establishing a clockline with the sensor and transmitting a clock signal to the sensor, wherein the clock signal transmitted to the sensor is based on the clock signal received from the controller (iv) a first master-in-slave-out connector for establishing a data line for data transfer from the interface adaptor to the controller, and a second master-in-slave-out connector for establishing a data line for data transfer from the sensor to the interface adaptor, (v) a first master-out-slave-in connector for establishing a data line for data transfer from the controller to the interface adaptor, and a second master-out-slave-in connector for establishing a data line for data transfer from the interface adaptor to the sensor; and (vi) a first chip select connector for establishing a line that enables the controller to select an interface adaptor or sensor from among a plurality of interface adaptors or sensors connected to the controller, and a second chip select connector for establishing a line that enables selection of the sensor by the controller from among a plurality of sensors connected to the controller.

The invention additionally provides an interface adaptor configured for communicable coupling with a controller and with a sensor, wherein the coupling with the controller and with the sensor enables the interface adaptor to function as a communication intermediary between the controller and the sensor for coupling the controller and the sensor in a master-slave configuration.

The interface adaptor may comprise (i) an adaptor body that is configured to communicably interface with the controller and to communicably interface with the sensor, (ii) a first set of connectors configured for enabling the interface adaptor to interface with corresponding connectors of the controller, (iii) a second set of connectors configured for enabling the interface adaptor to interface with corresponding connectors of the sensor, (iv) one or more conductive paths connecting the connectors within the first set of connectors with connectors within the second set of connectors, and (v) a slave device identification controller.

The slave device identification controller may be configured to (i) retrievably store data identifying the sensor that is interfaced with the interface adaptor, and (ii) to enable transmission of the data identifying the sensor, from the interface adaptor to the controller.

The interface adaptor may be configured such that the data identifying the sensor that is retrievably stored by the slave device identification controller comprises data describing any one or more of sensor type, a unique sensor ID, sensor manufacturer, sensor model number, sensor revision number, data bus or data interface incorporated by the sensor, or any of a number, placement, size, configuration and functionality of connectors disposed on the sensor.

In a specific embodiment of the interface adaptor, the data identifying the sensor that is retrievably stored by the slave device identification controller (i) is pre-stored within a memory, that is accessible by the slave device identification controller, during manufacture of the interface adaptor, or (ii) is determined based on analysis of information received during a query-response communication session between the interface adaptor and the sensor.

In another embodiment, the interface adaptor includes a processor configured to implement one or more data processing operations on state data received at the interface adaptor from the sensor, prior to onward transmission of such state data to the controller.

In a further embodiment of the interface adaptor, the one or more data processing operations may comprise any of state data translation, state data transcoding, state data downsampling, state data format conversion, generation of a high dynamic range (HDR) data output based on a plurality of data signals received from sensor, and conversion of data received over a first data bus or a first data communication standard to data configured for transmission over a second data bus or second data communication standard.

The interface adaptor may additionally include a power regulator, configured to (i) receive an input power signal from a power source within the controller, wherein the input power signal at a first voltage, first current and first frequency, and (ii) modulate the input power and transmit an output power signal to the sensor at a second voltage, second current and second frequency. In a particular embodiment, at least one of the second voltage, second current and second frequency is different from the first voltage, first current and first frequency.

The interface adaptor may be configured such that the output power signal from the power regulator matches the voltage, current and frequency requirements of an input power signal required by the sensor.

In an embodiment of the interface adaptor, the slave device identification controller is configured such that when the sensor is coupled with the interface adaptor controller, the slave device identification controller responds to being coupled with the controller by transmitting the data identifying the sensor, to the controller.

The interface adaptor may in an embodiment be configured such that (i) the interface adaptor is coupled with the sensor, (ii) the interface adaptor is coupled with the controller, or (iii) the interface adaptor is respectively coupled with each of the sensor and the controller.

The interface adaptor may include one or more of (i) a first power connector for establishing a power line with the controller, and a second power connector for establishing a second power line with the sensor, (ii) a first ground connector for establishing a ground connection with the controller and a second ground connector for establishing a ground connection with the sensor, (iii) a first clockline connector 4065 for establishing a clockline with the controller and for receiving a clock signal from the controller and a second clockline connector for establishing a clockline with the sensor and transmitting a clock signal to the sensor, wherein the clock signal transmitted to the sensor is based on the clock signal received from the controller (iv) a first master-in-slave-out connector for establishing a data line for data transfer from the interface adaptor to the controller, and a second master-in-slave-out connector for establishing a data line for data transfer from the sensor to the interface adaptor, (v) a first master-out-slave-in connector for establishing a data line for data transfer from the controller to the interface adaptor, and a second master-out-slave-in connector for establishing a data line for data transfer from the interface adaptor to the sensor; and (vi) a first chip select connector for establishing a line that enables the controller to select an interface adaptor or sensor from among a plurality of interface adaptors or sensors connected to the controller, and a second chip select connector for establishing a line that enables selection of the sensor by the controller from among a plurality of sensors connected to the controller.

The invention further provides a method of adding a sensor to a sensor system. The method comprises (i) coupling with a controller, an interface adaptor that has been coupled with a sensor, such that the interface adaptor functions as a communication intermediary between the controller and the sensor, and said interface adaptor enables the controller and the sensor to be communicably coupled in a master-slave arrangement, (ii) transmitting to the controller, from a slave device identification controller within the interface adaptor, data identifying the sensor, (iii) identifying at the controller, an identity or type or sensor capabilities corresponding to the sensor, wherein the identification is based on the data received from the slave device identification controller, (iv) selecting at the controller, a set of instructions that are associated with the identified identity, type or sensor capabilities corresponding to the sensor, and (v) implementing control of the sensor by the controller based on the selected set of instructions.

In a particular embodiment of the method, wherein the step of coupling the interface with the controller is preceded by decoupling another interface adaptor from the controller.

It will be understood that various embodiments of the above described methods may by implemented using the sensor system(s) and/or interface adaptor(s) described above—and the methods may include specific method steps that have been described above as being implemented by the sensor system(s) and/or interface adaptor(s) or by one or more components thereof.

Figure 12:
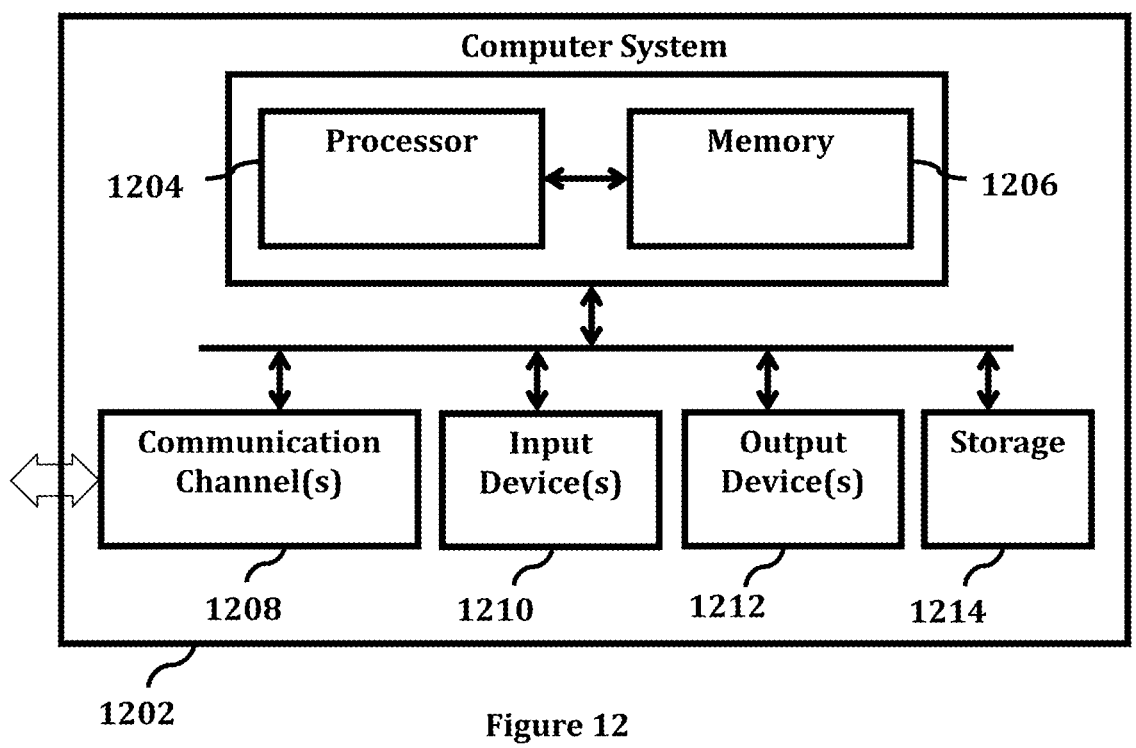
FIG. 12 illustrates an exemplary computer system according to which various embodiments of the present invention may be implemented.

FIG. 12 illustrates an exemplary computer system 1202 which may be used to implement various embodiments of the controller 402 described above.

Computer system 1202 comprises one or more processors 1204 and at least one memory 1206. Processor 1204 is configured to execute program instructions—and may be a real processor or a virtual processor. It will be understood that computer system 1202 does not suggest any limitation as to scope of use or functionality of described embodiments. The computer system 1202 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1202 in accordance with the present invention may include one or more servers, desktops, laptops, tablets, smart phones, mobile phones, mobile communication devices, tablets, phablets and personal digital assistants. In an embodiment of the present invention, the memory 1206 may store software for implementing various embodiments of the present invention. The computer system 1202 may have additional components. For example, the computer system 1202 may include one or more communication channels 1208, one or more input devices 1210, one or more output devices 1212, and storage 1214. An interconnection mechanism (not shown) such as a bus, controller, or network, interconnects the components of the computer system 1202. In various embodiments of the present invention, operating system software (not shown) provides an operating environment for various softwares executing in the computer system 1202 using a processor 1204, and manages different functionalities of the components of the computer system 1202.

The communication channel(s) 1208 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1210 may include, but is not limited to, a touch screen, a keyboard, mouse, pen, joystick, trackball, a voice device, a scanning device, or any another device that is capable of providing input to the computer system 1202. In an embodiment of the present invention, the input device(s) 1210 may be a sound card or similar device that accepts audio input in analog or digital form. The output device(s) 1212 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1202.

The storage 1214 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1202. In various embodiments of the present invention, the storage 1214 may contain program instructions for implementing any of the described embodiments.

In an embodiment of the present invention, the computer system 1202 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1202. The method described herein is typically implemented as a computer program product, comprising a set of program instructions that is executed by the computer system 1202 or any other similar device. The set of program instructions may be a series of computer readable codes stored on a tangible medium, such as a computer readable storage medium (storage 1214), for example, diskette, CD-ROM, ROM, flash drives or hard disk, or transmittable to the computer system 1202, via a modem or other interface device, over either a tangible medium, including but not limited to optical or analogue communications channel(s) 1208. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages—in particular, by enabling dynamically adding, substituting, swapping or hot-swapping of sensors into an operating system, in a convenient manner with low system latency and significantly reduced response times.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

I claim:

1. A sensor system, comprising:
   an interface adaptor configured for communicable coupling with a controller and with a sensor, wherein the coupling with the controller and with the sensor enables the interface adaptor to function as a communication intermediary between the controller and the sensor for coupling the controller and the sensor in a master-slave configuration, the interface adaptor comprising:
   an adaptor body that is configured to communicably interface with the controller and to communicably interface with the sensor;
   a first set of connectors configured for enabling the interface adaptor to interface with corresponding connectors of the controller;
   a second set of connectors configured for enabling the interface adaptor sensor to interface with corresponding connectors of the sensor;
   one or more conductive paths connecting the connectors within the first set of connectors with connectors within the second set of connectors; and
   a slave device identification controller configured to:
     retrievably store data identifying the sensor that is interfaced with the interface adaptor; and
     to enable transmission of the data identifying the sensor, from the interface adaptor to the controller.

2. The sensor system as claimed in claim 1, wherein the data identifying the sensor that is retrievably stored by the slave device identification controller comprises data describing any one or more of sensor type, a unique sensor ID, sensor manufacturer, sensor model number, sensor revision number, data bus or data interface incorporated by the sensor, or any of a number, placement, size, configuration and functionality of connectors disposed on the sensor.

3. The sensor system as claimed in claim 1, wherein the data identifying the sensor that is retrievably stored by the slave device identification controller:
   is pre-stored within a memory, that is accessible by the slave device identification controller, during manufacture of the interface adaptor; or
   is determined based on analysis of information received during a query-response communication session between the interface adaptor and the sensor.

4. The sensor system as claimed in claim 1, wherein the interface adaptor includes a processor configured to implement one or more data processing operations on state data received at the interface adaptor from the sensor, prior to onward transmission of such state data to the controller.

5. The sensor system as claimed in claim 4, wherein the one or more data processing operations comprises any of state data translation, state data transcoding, state data downsampling, state data format conversion, generation of a high dynamic range (HDR) data output based on a plurality of data signals received from sensor, and conversion of data received over a first data bus or a first data communication standard to data configured for transmission over a second data bus or second data communication standard.

6. The sensor system as claimed in claim 1, wherein the interface adaptor includes a power regulator, configured to:
   receive an input power signal from a power source within the controller, wherein the input power signal at a first voltage, first current and first frequency; and
   modulate the input power and transmit an output power signal to the sensor at a second voltage, second current and second frequency;
   wherein at least one of the second voltage, second current and second frequency is different from the first voltage, first current and first frequency.

7. The sensor system as claimed in claim 6, wherein the output power signal from the power regulator matches the voltage, current and frequency requirements of an input power signal required by the sensor.

8. The sensor system as claimed in claim 1, wherein the slave device identification controller is configured such that when the sensor is coupled with the interface adaptor controller, the slave device identification controller responds to being coupled with the controller by transmitting the data identifying the sensor, to the controller.

9. The sensor system as claimed in claim 1, wherein:
   the interface adaptor is coupled with the sensor;
   the interface adaptor is coupled with the controller; or
   the interface adaptor is respectively coupled with each of the sensor and the controller.

10. The sensor system as claimed in claim 9, wherein:
    the controller includes one or more of (i) a processor, (ii) a power connector for establishing a power line with the sensor, (iii) a ground connector for establishing a ground connection with the sensor, (iv) a clockline connector for establishing a clockline with the sensor and for generating and transmitting a clock signal to the sensor, (v) a master-in-slave-out connector for establishing a data line for data transfer from the sensor to the controller, (vi) a master-out-slave-in connector for establishing a data line for data transfer from the controller to the sensor, (vii) a chip select connector for establishing a line that enables selection of a particular sensor from among a plurality of sensors connected to the controller and (viii) an ID interface for receiving data identifying the sensor, from the slave device identification controller; or
    the sensor includes one or more of (i) a state sensing component, (ii) a power connector for establishing a power line with the controller, (iii) a ground connector for establishing a ground connection with the controller, (iv) a clockline connector for establishing a clockline with the controller and for receiving a clock signal from the controller, (v) a master-in-slave-out connector for establishing a data line for data transfer from the sensor to the controller, (vi) a master-out-slave-in connector for establishing a data line for data transfer from the controller to the sensor, and (vii) a chip select connector for establishing a line that enables selection of the sensor from among a plurality of sensors connected to the controller.

11. The sensor system as claimed in claim 10, wherein the interface adaptor comprises one or more of (i) a first power connector for establishing a power line with the controller, and a second power connector for establishing a second power line with the sensor, (ii) a first ground connector for establishing a ground connection with the controller and a second ground connector for establishing a ground connection with the sensor, (iii) a first clockline connector 4065 for establishing a clockline with the controller and for receiving a clock signal from the controller and a second clockline connector for establishing a clockline with the sensor and transmitting a clock signal to the sensor, wherein the clock signal transmitted to the sensor is based on the clock signal received from the controller (iv) a first master-in-slave-out connector for establishing a data line for data transfer from the interface adaptor to the controller, and a second master-in-slave-out connector for establishing a data line for data transfer from the sensor to the interface adaptor, (v) a first master-out-slave-in connector for establishing a data line for data transfer from the controller to the interface adaptor, and a second master-out-slave-in connector for establishing a data line for data transfer from the interface adaptor to the sensor; and (vi) a first chip select connector for establishing a line that enables the controller to select an interface adaptor or sensor from among a plurality of interface adaptors or sensors connected to the controller, and a second chip select connector for establishing a line that enables selection of the sensor by the controller from among a plurality of sensors connected to the controller.

12. An interface adaptor configured for communicable coupling with a controller and with a sensor, wherein the coupling with the controller and with the sensor enables the interface adaptor to function as a communication intermediary between the controller and the sensor for coupling the controller and the sensor in a master-slave configuration, the interface adaptor comprising:
    an adaptor body that is configured to communicably interface with the controller and to communicably interface with the sensor;
    a first set of connectors configured for enabling the interface adaptor to interface with corresponding connectors of the controller;
    a second set of connectors configured for enabling the interface adaptor to interface with corresponding connectors of the sensor;
    one or more conductive paths connecting the connectors within the first set of connectors with connectors within the second set of connectors; and
    a slave device identification controller configured to:
       retrievably store data identifying the sensor that is interfaced with the interface adaptor; and
       to enable transmission of the data identifying the sensor, from the interface adaptor to the controller.

13. The interface adaptor as claimed in claim 12, wherein the data identifying the sensor that is retrievably stored by the slave device identification controller comprises data describing any one or more of sensor type, a unique sensor ID, sensor manufacturer, sensor model number, sensor revision number, data bus or data interface incorporated by the sensor, or any of a number, placement, size, configuration and functionality of connectors disposed on the sensor.

14. The interface adaptor as claimed in claim 12, wherein the data identifying the sensor that is retrievably stored by the slave device identification controller:

is pre-stored within a memory, that is accessible by the slave device identification controller, during manufacture of the interface adaptor; or is determined based on analysis of information received during a query-response communication session between the interface adaptor and the sensor.

15. The interface adaptor as claimed in claim 12, comprising a processor configured to implement one or more data processing operations on state data received at the interface adaptor from the sensor, prior to onward transmission of such state data to the controller.

16. The interface adaptor as claimed in claim 15, wherein the one or more data processing operations comprises any of state data translation, state data transcoding, state data downsampling, state data format conversion, generation of a high dynamic range (HDR) data output based on a plurality of data signals received from sensor, and conversion of data received over a first data bus or a first data communication standard to data configured for transmission over a second data bus or second data communication standard.

17. The interface adaptor as claimed in claim 12, comprising a power regulator, configured to:

receive an input power signal from a power source within the controller, wherein the input power signal at a first voltage, first current and first frequency; and modulate the input power and transmit an output power signal to the sensor at a second voltage, second current and second frequency;

wherein at least one of the second voltage, second current and second frequency is different from the first voltage, first current and first frequency.

18. The interface adaptor as claimed in claim 17, wherein the output power signal from the power regulator matches the voltage, current and frequency requirements of an input power signal required by the sensor.

19. The interface adaptor as claimed in claim 12, wherein the slave device identification controller is configured such that when the sensor is coupled with the interface adaptor controller, the slave device identification controller responds to being coupled with the controller by transmitting the data identifying the sensor, to the controller.

20. The interface adaptor as claimed in claim 12, wherein:
the interface adaptor is coupled with the sensor;
the interface adaptor is coupled with the controller; or
the interface adaptor is respectively coupled with each of the sensor and the controller.

21. The interface adaptor as claimed in claim 12, wherein the interface adaptor comprises one or more of (i) a first power connector for establishing a power line with the controller, and a second power connector for establishing a second power line with the sensor, (ii) a first ground connector for establishing a ground connection with the controller and a second ground connector for establishing a ground connection with the sensor, (iii) a first clockline connector 4065 for establishing a clockline with the controller and for receiving a clock signal from the controller and a second clockline connector for establishing a clockline with the sensor and transmitting a clock signal to the sensor, wherein the clock signal transmitted to the sensor is based on the clock signal received from the controller (iv) a first master-in-slave-out connector for establishing a data line for data transfer from the interface adaptor to the controller, and a second master-in-slave-out connector for establishing a data line for data transfer from the sensor to the interface adaptor, (v) a first master-out-slave-in connector for establishing a data line for data transfer from the controller to the interface adaptor, and a second master-out-slave-in connector for establishing a data line for data transfer from the interface adaptor to the sensor; and (vi) a first chip select connector for establishing a line that enables the controller to select an interface adaptor or sensor from among a plurality of interface adaptors or sensors connected to the controller, and a second chip select connector for establishing a line that enables selection of the sensor by the controller from among a plurality of sensors connected to the controller.

22. A method of adding a sensor to a sensor system, the method comprising:

coupling with a controller, an interface adaptor that has been coupled with a sensor, such that the interface adaptor functions as a communication intermediary between the controller and the sensor, and said interface adaptor enables the controller and the sensor to be communicably coupled in a master-slave arrangement;

transmitting to the controller, from a slave device identification controller within the interface adaptor, data identifying the sensor;

identifying at the controller, an identity or type or sensor capabilities corresponding to the sensor, wherein the identification is based on the data received from the slave device identification controller;

selecting at the controller, a set of instructions that are associated with the identified identity, type or sensor capabilities corresponding to the sensor; and implementing control of the sensor by the controller based on the selected set of instructions.

23. The method as claimed in claim 22, wherein the step of coupling the interface with the controller is preceded by decoupling another interface adaptor from the controller.

\* \* \* \* \*